United States Patent [19]

Graham

[11] 4,254,664
[45] Mar. 10, 1981

[54] FLOW METERS

[75] Inventor: Ian G. Graham, Sussex, England

[73] Assignee: Gervase Instruments Limited, Surrey, England

[21] Appl. No.: 63,202

[22] Filed: Aug. 3, 1979

[51] Int. Cl.³ .............................................. G01F 1/22
[52] U.S. Cl. ................................................. 73/861.58
[58] Field of Search .......................... 73/207, 210, 211

[56] References Cited

U.S. PATENT DOCUMENTS

| 599,746 | 3/1898 | St. John | 73/210 |
|---|---|---|---|
| 2,816,441 | 12/1957 | Ezekiel | 73/207 |
| 2,941,401 | 6/1960 | Streeter | 73/210 |
| 3,182,501 | 5/1965 | Haase | 73/207 |
| 3,528,288 | 9/1970 | Scourtes | 73/207 |

*Primary Examiner*—Herbert Goldstein
*Attorney, Agent, or Firm*—Wood, Herron & Evans

[57] ABSTRACT

A fluid flow meter that includes a flow tube having a fluid flow input and a fluid flow output, the tube also having a peripheral wall that defines a generally circular flow cross-section. A round measuring orifice is provided in the tube and between the input and the output. A contoured plug is slidably mounted in the orifice on an axial slide, the plug being normally biased toward the inlet so as to close the orifice. The plug is of a curvilinear tapering cross-section, the curvature of which is such as to produce a linear relationship between differential pressure across an annulus formed by the coincidence of the plug and the orifice and between the flow through the annulus. A fluid flow indicator serves to indicate the fluid flow through the flow tube.

3 Claims, 2 Drawing Figures

FLOW METERS

This invention relates to a device for measuring the rate of flow of a fluid in a conduit. More particularly, it relates to a device having an orifice through which the fluid passes, thereby causing a differential pressure across the orifice.

It is already known to provide means for varying the effective area of the orifice. Meters having such means are, for example, described in the British Patent Specification No. 1 190 912. Therein the measuring orifice has an effective area which is related to the axial position of an orifice plug relative to the orifice. This axial position is dependent upon the differential pressure across the orifice, there being a control member provided which is coupled to the orifice plug and which is subjected to the differential pressure.

According to the present invention there is provided in a flow tube a measuring orifice whose effective area is determined by the relative position of a slidable orifice plug of conical section which is biased against the fluid flow in a direction so as to close the orifice and which is slidably mounted upon a longitudinal support axially disposed in the fluid flow path. In such an arrangement the conical plug itself comprises the aforesaid control member and provides an effective reaction area which varies dependent upon the position of the plug relative to the orifice and which increases as the effective area of the orifice increases.

By arranging for the area of the orifice to vary as a function of the fluid flow rate values for the fluid flow rate may be derived directly from a reading of the differential pressure generated across the orifice without recourse to further calibration.

The invention is further described by way of example with reference to the accompanying drawings wherein.

Figure 1:
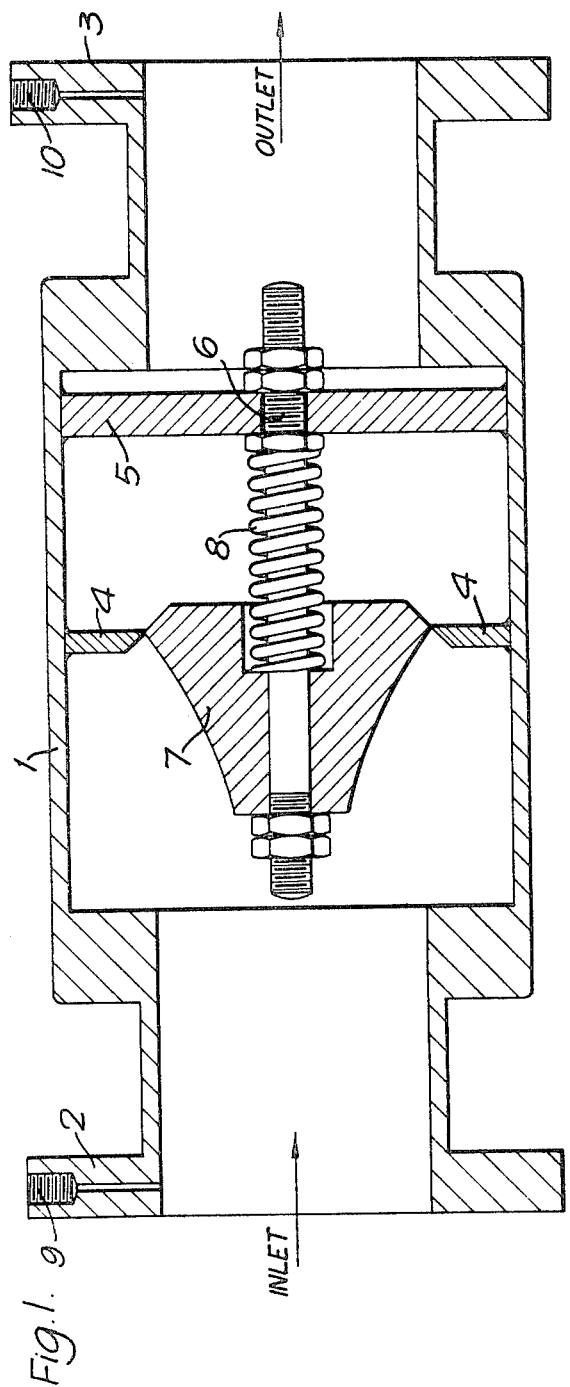
FIG. 1 show schematically a flow meter according to the invention.

Referring now to the Figures, the flow meter comprises a tube 1 having flanges 2, 3 respectively at the inlet and outlet for insertion in a pipe line.

Fixed to the internal wall of the tube is a concentric orifice plate 4. Downstream of the orifice is a spindle support 5 fixed to the internal wall of the pressure vessel. The support holds a longitudinal shaft 6 on which an orifice plug 7 in the form of a contoured cone is slidingly mounted. Plug 7 is biased towards the inlet end of shaft 6 by spring 8, so as normally to close the orifice. Tappings 9,10 respectively in the inlet and outlet conduits are provided to enable the differential pressure across the orifice to be measured by means of a manometer or the like.

In operation the fluid flow energy moves the orifice plug 7 along the shaft 6 towards the outlet and against the restraint of the spring 8 until a suitable flow annulus is created between the fixed orifice and the concentric contoured conical side of the plug thus allowing the fluid to pass through the device without further movement of the plug.

The construction of the contoured cone is by turning this in a lathe. In order to determine the shape and the control for the lathe, the shape of the cone is determined by a formula giving a relationship between x and y where x is the axial dimension of the plug 7 from its closed position in the orifice plate 4 and y is the radius of the plug 7 at a point across the orifice in the orifice plate 4.

The relationship between x and y is:

$$Cx = \frac{K\pi y^2 A^2 (a - \pi y^2)^2}{A_1^2 - (a - \pi y^2)^2}$$

where

C is the constant rating of spring 8
K is a constant
A is the internal area of tube 1
a is the area of the orifice in orifice plate 4.

After construction of the contoured cone according to the above relationship it may be necessary to slightly modify the cone shape after calibration of the meter in order to allow for slight errors in determining the integers for the formula.

Figure 2:
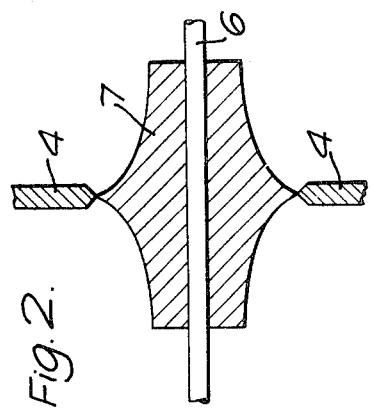
FIG. 2 shows a modified form of the orifice plug.

Using a double profiled plug contoured to the same formula and as shown in FIG. 2, the device may be constructed as a bi-directional flowmeter capable of measurement of flow rate in reverse direction.

I claim:

1. A fluid flow meter comprising
a flow tube having fluid flow input and fluid flow output means, said tube having a peripheral wall defining a generally circular flow cross-section,
a round measuring orifice provided in said tube between said input and output means,
a contoured plug slidably mounted on an axial slide in said orifice, said plug being of curvilinear tapering cross-section with the curvature of the contouring being such as to produce a linear relationship between differential pressure across an annulus formed by the coincidence of said plug and said orifice and between the flow through said annulus, said tapering cross-section and said orifice forming an annulus of area a, and said tapering cross-section being determined by means of the formula:

$$Cx = \frac{K\pi y^2 A^2 (a - \pi y^2)^2}{A^2 - (a - \pi y^2)^2}$$

where x is the axial dimension of said plug from its closed position in said orifice, y is the radius of said plug at said orifice, and A is the internal area of said tube upstream of said orifice,
biasing means urging said plug toward said inlet so as to close said orifice when there is no fluid flow, and
fluid flow indicating means serving to indicate the fluid flow through said flow tube.

2. A fluid flow meter as claimed in claim 1, said plug including two tapering cross-sections facing opposite directions whereby said inlet may be at either end of said flow tube.

3. A fluid flow meter as claimed in claim 1, said orifice being provided with a tapering cross-section narrowing towards said output.